Figure 1:
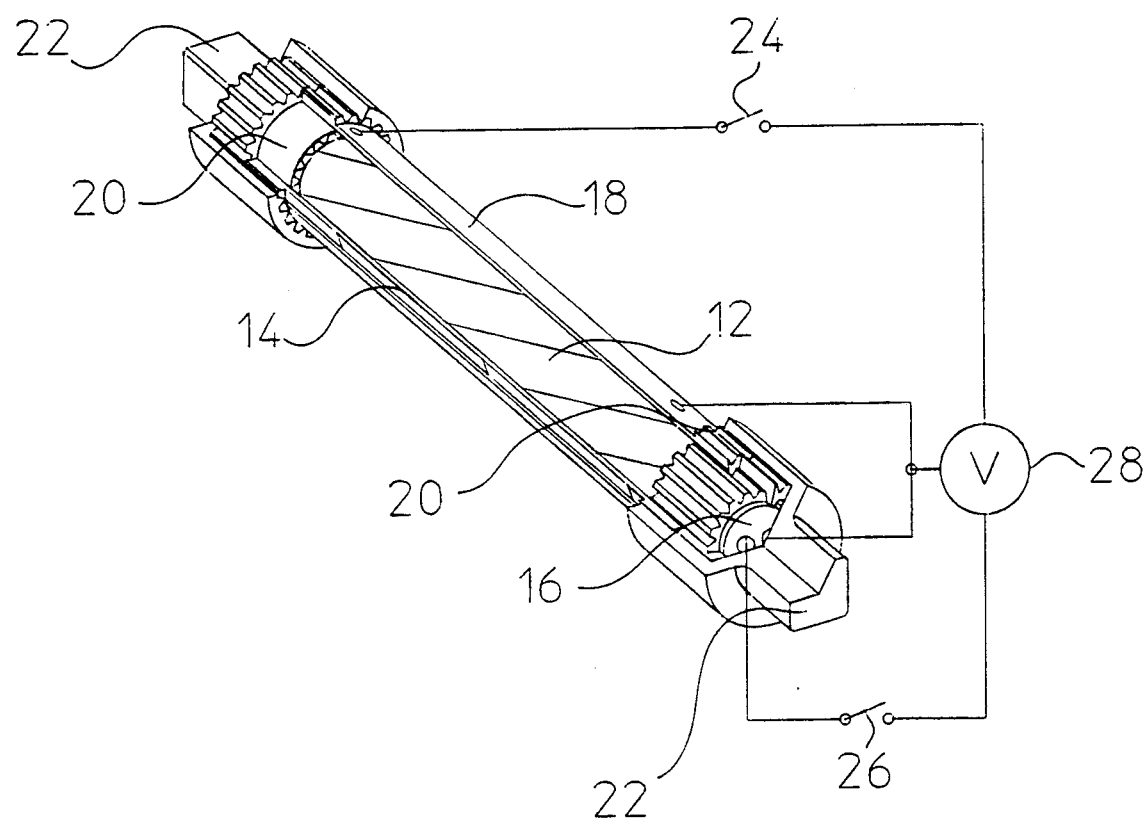

United States Patent [19]

Swenson

[11] Patent Number: 5,127,228

[45] Date of Patent: Jul. 7, 1992

[54] SHAPE MEMORY BI-DIRECTIONAL ROTARY ACTUATOR

[76] Inventor: Steven R. Swenson, P.O. Box 863, Saratoga, Calif. 95071-0863

[21] Appl. No.: 652,578

[22] Filed: Feb. 7, 1991

[51] Int. Cl.⁵ .................................................. F03G 7/06
[52] U.S. Cl. ......................................... 60/527; 60/528
[58] Field of Search .......................... 60/527, 528, 529

[56] References Cited

U.S. PATENT DOCUMENTS

| | | | |
|---|---|---|---|
| 4,010,455 | 3/1977 | Strange | 340/224 |
| 4,700,541 | 10/1987 | Gabriel | 60/528 |
| 4,887,430 | 12/1989 | Kroll | 60/527 |

OTHER PUBLICATIONS

"Passive Sun Seeker/Tracker and Thermally Activated Power Module" Seibert and Morris.

"Shape Memory Alloy Actuator Drive Rotary Actuator" Design News, Feb. 1990.

"Special Alloy is Key to Braille Computer Display" Design News, Feb. 1990.

*Primary Examiner*—Allen M. Ostrager

[57] ABSTRACT

A shape memory actuator capable of high torque densities capable of being used on space applications and other fields. The actuator is made of two concentric tubular shape memory alloy (SMA) members (12 and 14) torsioned along their longitudinal axis with ends constrained relative to each other. One end of the actuator is constrained while the other is the output. A heater (16) is located inside the inner SMA member (12). A heater (18) is located on the outside of the outer SMA member (14). The unconstrained end is caused to rotate between positions by applying current to the appropriate heater.

2 Claims, 2 Drawing Sheets

5,127,228

SHAPE MEMORY BI-DIRECTIONAL ROTARY ACTUATOR

BACKGROUND

1. Field of Invention

This invention relates to Machine Elements that perform rotary functions, specifically those utilizing shape memory alloys that reciprocate between positions.

2. Description of Prior Art

Shape Memory Alloys (SMA) form a group of metals that have interesting mechanical properties. The property of their namesake, shape memory, is that the alloy when deformed at below the martensite finish temperature and then heated to above austenite temperature, the alloy resumes its shape prior to the deformation. Actuation devices employing SMA for light duty are well known. Typically these actuators use a single SMA member that is deformed in some manner and a return bias spring mechanically connected to the shape memory member. These actuators, called bias spring type, when heated, thermally or by other means, the SMA member returns to shape prior to deformation and thereby overcoming the force of the bias spring. When the device is allowed cool the spring deforms the SMA member returning the actuator to the original position. Actuators of the bias spring type and the differential type have been used in micro application such as Olosky's Braille Pin Actuator developed by TiNi Company of Oakland, Calif. to macro applications like Sun Tracker Developed by Siebert and Morris of Martin Merrieta Denver Aerospace, Denver, Colo.

A second type of actuator, called a differential type uses two SMA members mechanically connected in series. Heating one of the SMA members, performs work in one direction and deforms the other SMA member. Heating the other SMA member performs work in the other direction deforming the SMA member heated first.

Strange U.S. Pat. No. 4,010,455 shows a bi-directional device that uses heat extensible springs, 24 and 26, made of shape memory alloy. The shape memory members in this device are flat, fixed at each end and mechanically connected to a crank to perform the rotary actuation. The SMA members are deformed in bending and heated by termofoil heaters bonded to the top and bottom surfaces. Gabriel et al U.S. Pat. No. 4,700,541 shows a device with two SMA wires 101 mechanically connected in series, torsioned along their longitudinal axis with the ends constrained against movement. The SMA members are heated through internal resistance with a plurity of electrical connections. Kroll et al U.S. Pat. No. 4,887,430 shows a bi-stable device employing two opposing internally resistance hated SMA coil springs, 16 and 24, as the SMA members. A detent retainer 40 is used to hold the actuated element in a desired position.

Although the Shape Memory Actuator known heretofore have worked for their limited applications they suffer from several disadvantages:

(a) Bias spring type actuators do not have two positions which are stable for either the above austenite temperature or below martensite finish temperature.

(b) Work output per unit volume is sixty percent lower for SMA members used in bending. This is due to the neutral axis shift caused by the difference between compressive and tensile yield points. Most coil spring SMA members suffer this because for the SMA member to remain in pure torsion for any appreciable motion the spring coil diameter becomes impractically large.

(c) Internally resistance heated SMA members can be jerky in their motion due to hot spots created by imperfections in the alloy grain structure.

(d) Internally resistance heated SMA members are limited to small cross sections and therefor small work outputs to be practical. As cross sectional area increases the current required to heat the SMA member becomes large and impractical for most applications.

(e) Solid rods in torsion are inefficient from a weight and power standpoint. The center material of a solid rod is doing little work for the added weight and is heated along with the rest of the SMA member during the actuation.

(f) The differential actuators known heretofore all have each end of the SMA members constrained with the output of the device between the fixed ends. This makes for a device that is hard to integrate into existing systems.

OBJECTS AND ADVANTAGES

Accordingly several objects and advantages of the present invention are:

(a) to provide an actuator type with two positions which are stable for both the above austenite temperature or below martensite finish temperature condition;

(b) to provide an actuator that utilizes the material at its maximum work output per unit volume;

(c) to provide an actuator with smooth motion between position through even heating methods;

(d) to provide an actuator with large work outputs and practical power requirements;

(e) to provide an actuator that is efficient in the use of the SMA (f) to provide an actuator constrained at one end with the output of the other end.

Further objects and advantages are to provide actuator with substantially higher torque densities than electro-mechanical, pneumatic, or hydraulic actuators; to provide an actuator that creates no noise; to provide space rated actuator at a greatly reduced price; and to provide a more reliable actuator than the present electro-mechanical, pneumatic, or hydraulic actuators. Still further objects and advantages will become apparent from a consideration of the ensuing description and drawings.

DRAWING FIGURES

Figure 2:
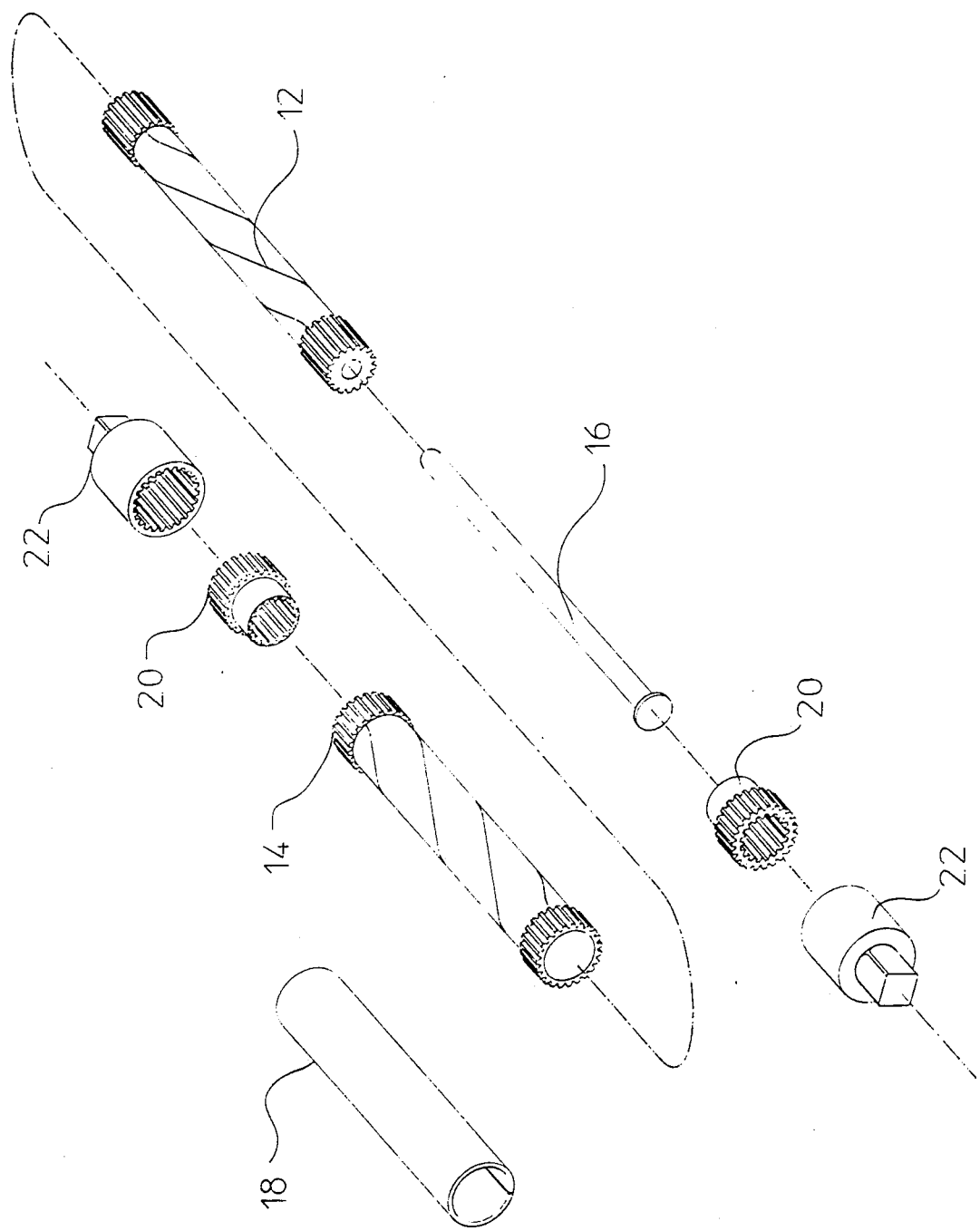

In the drawing FIG. 1 shows the details of the preferred embodiment of the invention and in FIG. 2 is an exploded view of the preferred embodiment.

REFERENCE NUMERALS IN DRAWINGS

12—Inner SMA Member
14—Outer SMA Member
16—Inner SMA Member Heater
18—Outer SMA Member Heater
20—Indexing Standoff
22—Indexing End Cap
24—Outer Heater Switch
26—Inner Heater Switch
28—Voltage Supply

DESCRIPTION—FIG. 1 AND FIG. 2

A typical embodiment of the actuator is presented in FIG. 1 and exploded view of that embodiment in FIG.

2. The actuator is comprised of two concentric tubular SMA members, an inner SMA member 12 and an outer SMA member 14. The end of the SMA members are mechanically connected and restrained to an indexed position relative to each other. Though not required the present preferred embodiment uses a spline arrangement. Internal splines of indexing standoffs 20 engage the external splines of the inner SMA member 12. The indexing end caps 22 have internal splines that engage the external splines of both the outer SMA member 14 and the indexing standoffs 20. The spline arrangement mechanically restrains the ends relative to each other and provides adjustability in the relative twist of the SMA members. Heaters can be located either on the inside or the outside of the SMA members provide that they are thermally insulated from heating the wrong SMA member. The preferred embodiment has the inner SMA member heater 16 located inside the inner SMA member 12. The outer SMA member heater 18 is located on the outside of the outer SMA member 14.

In the preferred embodiment the SMA members are designed to provide equal torque outputs in either direction. The inner and outer diameters of SMA members are selected for the desired output torque and to match the polar moments of inertia. The lengths are selected to provide the desired rotary motion and to most closely match the individual torque curves. We have found that a design with ten percent strain developed in either SMA member between positions gives satisfactory results.

OPERATION—FIG. 1

Initially both SMA members are martensite with the inner SMA member 12 twisted relative the outer SMA member 14. Actuation is accomplished by closing the inner heater switch 26 to apply power from the voltage supply 28 to the inner SMA member heater 16 heating the inner SMA member above its austenite finish temperature. When the material becomes austenite the associated shift in the modulus increases the internal stresses in the SMA member. Strain recovery proceeds at the elevated stress until the strain coincides with the yield point. The output torque driven by the internal stress then drops off as function of the austenite modulus. Simultaneous to this the outer SMA member 14 is being deformed in its martensite form by the inner SMA member 12 which is in its austenite form. The actuation stops when the torques of the two SMA members balance. Reverse actuation is accomplished by allowing the inner SMA member 12 to first cool to the martensite finish temperature. Closing the outer heater switch 24 to apply power from the voltage supply 28 to the outer SMA member heater 18 heating the now deformed outer SMA member 14 above the austenite finish temperature. The actuation proceeds as it did in the opposite direction with the roles of the inner and outer SMA member reversed.

SUMMARY, RAMIFICATIONS, AND SCOPE

An advancement is made in the art of actuators using shape member allows (SMA). The reader can see the simplicity of the invention contains only six parts in the actuator not including the power supply and switching. The actuator need only be fixed at one end with the output taken from the other; the separate heater arrangement provides for practical power requirements, and smooth actuation; the concentric tube SMA members torsioned about their longitudinal axis provide a more efficient use of the SMA than the prior art; and the actuator being of the differential type is inherently stable at both positions.

Further advantages are that the actuator has substantially higher torque densities than electro-mechanical, pneumatic, or hydraulic actuators. For example a comparison to electro-mechanical actuator shows that the weight and volume of the present invention is only ten percent of an electro-mechanical actuator of equal torque. Inherent to most SMA actuators is that they create no noise. They is advantages for marine systems and other applications where noise is a concern. Space rated actuator at greatly reduced price can be accomplished due to the simplicity of design and the associated ease to manufacture. The simplicity of the designs provides for a more reliable actuator than the present electro-mechanical, pneumatic, or hydraulic actuators. This is crucial for space and safety related marine applications.

It is understood that the above described embodiments and applications are illustrative of the application of principles of the invention. Other arrangements may be devised without departing from the spirit and scope of the invention. For example it is clear that an actuator with unequal torque outputs can be devised by varying SMA members dimension to provide unequal polar moments of inertia. In addition the cross section could be something other than circular and still provide satisfactory results.

Thus the scope of the invention should be determined by the appended claims and their legal equivalents, rather than the embodiment given.

I claim:

1. An actuator comprising:
   a first member made of a shape memory alloy extending along a longitudinal axis having a first and second end;
   a second member made of a shape member alloy extending along a longitudinal axis having a first and second end;
   said first member being substantially tubular to accommodate the second member in a concentric relationship within the first member,
   the members being torsioned about their longitudinal axis and fixedly attached to each other at each of their ends;
   both members being fixed to a stationary support at one of their common ends;
   a first heater in operative cooperation with the first member;
   a second heater in operative cooperation with the second member;
   means for selectively activating one of said heaters to allow rotation of the members at the end which is opposite to end affixed to the stationary support.

2. A mechanical actuation system comprising:
   a first member made of a shape member alloy extending along a longitudinal axis having a first and second end;
   a second member made of a shape member extending along a longitudinal axis haling a first and second ends;
   said first member having substantially tubular to accommodate the second member in a concentric relationship within the first member;
   the members being torsioned about their longitudinal axis and fixedly attached to each other at each of their ends;

both members being fixed to a stationary support at one of their common ends;

a first heater in operative cooperation with the first member;

a second heater in operative connection with the second member;

means for selectively activating one of said heaters to allow rotation of the members at the end which is opposite to end affixed to the stationary support to a secondary position;

means for selectively activating the second of said heaters to allow rotation of the members at the end which is opposite to the end affixed to the stationary support to the initial position.

* * * * *